United States Patent [19]

Crisman et al.

[11] Patent Number: 5,570,920
[45] Date of Patent: Nov. 5, 1996

[54] ROBOT ARM END EFFECTOR

[75] Inventors: Jill D. Crisman, Wellesley, Mass.; Chaitanya Kanojia, Bhopal, Ind.; Ibrahim Zeid, Framingham, Mass.

[73] Assignee: Northeastern University, Boston, Mass.

[21] Appl. No.: 197,384

[22] Filed: Feb. 16, 1994

[51] Int. Cl.$^6$ .................................................. B25J 15/10
[52] U.S. Cl. .............................. 294/111; 901/36; 901/39
[58] Field of Search ..................... 294/106, 111, 294/115, 902, 907; 623/57, 63–65; 901/21, 31–33, 36–39, 46

[56] References Cited

U.S. PATENT DOCUMENTS

| | | | |
|---|---|---|---|
| 22,576 | 1/1859 | Palmer | 623/63 X |
| 1,377,956 | 5/1921 | Anderson | 623/63 |
| 1,466,163 | 8/1923 | Harris | 623/63 X |
| 3,694,021 | 9/1972 | Mullen | 294/111 X |
| 3,866,966 | 2/1975 | Skinner, II | 294/106 |
| 4,643,473 | 2/1987 | Douglas | 294/111 |
| 4,865,376 | 9/1989 | Leaver et al | 294/111 |
| 4,921,293 | 5/1990 | Ruoff et al. | 294/111 |
| 4,946,380 | 8/1990 | Lee | 294/111 X |
| 4,986,723 | 1/1991 | Maeda | 414/729 |
| 5,011,207 | 4/1991 | Stevens | 294/88 |
| 5,062,673 | 11/1991 | Mimura | 294/111 |
| 5,080,681 | 1/1992 | Erb | 623/63 |
| 5,080,682 | 1/1992 | Schectman | 623/64 |
| 5,130,632 | 7/1992 | Ezawa et al. | 318/568.11 |
| 5,200,679 | 4/1993 | Graham | 294/111 X |

FOREIGN PATENT DOCUMENTS

| | | | |
|---|---|---|---|
| 1211203 | 2/1986 | U.S.S.R. | 294/111 |
| 982217 | 2/1965 | United Kingdom | 623/64 |

*Primary Examiner*—Johnny D. Cherry
*Attorney, Agent, or Firm*—Weingarten, Schurgin, Gagnebin & Hayes

[57] ABSTRACT

A robot arm end effector in the form of a multi-fingered hand having a conformable grasp. Each articulating finger includes multiple phalanges sequentially interconnected by pivot points such that each finger articulates in one plane. One filament pair, which controls finger articulation within the plane, is routed through a respective finger by a system of pulleys and is controlled by a DC motor. Driving the associated motor in a first direction causes a respective finger to articulate in a first direction within the plane. Reversing the motor direction causes the respective finger to articulate in a second direction within the plane. Individual phalanges articulate independently of the motion of adjacent phalanges. A second filament pair may be employed to pivot a respective finger about a base axis resulting in out of plane motion of the finger.

17 Claims, 6 Drawing Sheets

ROBOT ARM END EFFECTOR

FIELD OF THE INVENTION

The invention generally relates to the field of robot end effectors, and specifically to tendoning systems for robot end effectors.

BACKGROUND OF THE INVENTION

As the applications for robotic end effectors such as robot hands have grown, so has grown the need for a simple, easily maintainable and controllable robot hand which provides a conformable grasp suitable for grasping a wide variety of objects. Prior art configurations have so far failed to provide such desired simplicity.

Among prior art robot hands, a common approach has been to attempt to control each finger joint individually. This typically involves discrete actuators, feedback regarding relative position of phalanges at the joint, and control commands for each actuator. The actuator commands are typically generated in response to a known geometry for an object to be grasped. Thus, a controller must compute the appropriate drive commands for each actuator, and must attempt to compensate for misalignment of the object during a grasping operation.

Obviously, providing discrete actuators and control capability for each joint is a complex design choice. One attempt at providing a robot hand having a conformable grasp employs individual clutch mechanisms at each joint. Implementation of the design is difficult as heightened levels of grasping force are required to alter the relative positions of the individual phalanges. Further, the clutches are prone to mechanical failure.

A further attempt at providing a robot hand with a conformable grasp involves fingers comprised of parallel, pliant pneumatic cylinders. However, this hand has been implemented with only eight discrete finger positions, thus limiting the ability of the hand to successfully conform the fingers to a variety of objects to be grasped.

SUMMARY OF THE INVENTION

The present invention provides a robot arm end effector in the form of a multi-fingered hand having a conformable grasp. Each articulating finger includes multiple phalanges sequentially interconnected by pivot points arranged such that each finger articulates in one plane when opposing filaments of a filament pair are manipulated. The filament pairs are routed through respective fingers by a system of pulleys disposed about the pivot points.

One pair of antagonistic filaments are associated with each finger for motion within the plane. Each filament pair is controlled by a single DC electric motor. Driving a motor in a first direction causes a first filament of the filament pair to contract while tension in a second filament of the pair slackens, thus causing a respective finger to articulate in a first direction within the plane. Reversing the motor direction causes the first filament to slacken and the second filament to contract, such that the respective finger articulates in a second direction within the plane. The disposition of pivot points within the fingers allows for phalanges attached to one pivot point to articulate independent of the motion at adjacent pivot points when sufficient tension in one of the two filaments exists. Sensors disposed on the fingers can provide feedback to a motor controller.

In an alternative embodiment, each finger also pivots laterally at a base region about an axis, resulting in out-of-plane motion of the finger. A second antagonistic filament pair controls the degree of lateral pivot by means of being oppositely wound about an associated motor rotor in a manner similar to that described with respect to the in-plane finger articulation.

The use of motor controlled antagonistic filaments greatly simplifies the robot hand of the present invention with respect to the prior art systems described above. Further, the present invention provides a truly conformable grasp, unlimited by predetermined finger positions and unconstrained by bulky mechanical devices including clutches. Repair of the present invention is also quite simple and inexpensive, since the only moving parts include the pulleys, the filaments, which can be sheathed cable as used in bicycle brake and shifting applications, and common electric motors.

BRIEF DESCRIPTION OF THE DRAWINGS

These and other features and advantages of the present invention will be better understood by reading the following detailed description, taken together with the drawings wherein.

DETAILED DESCRIPTION

Figure 1:
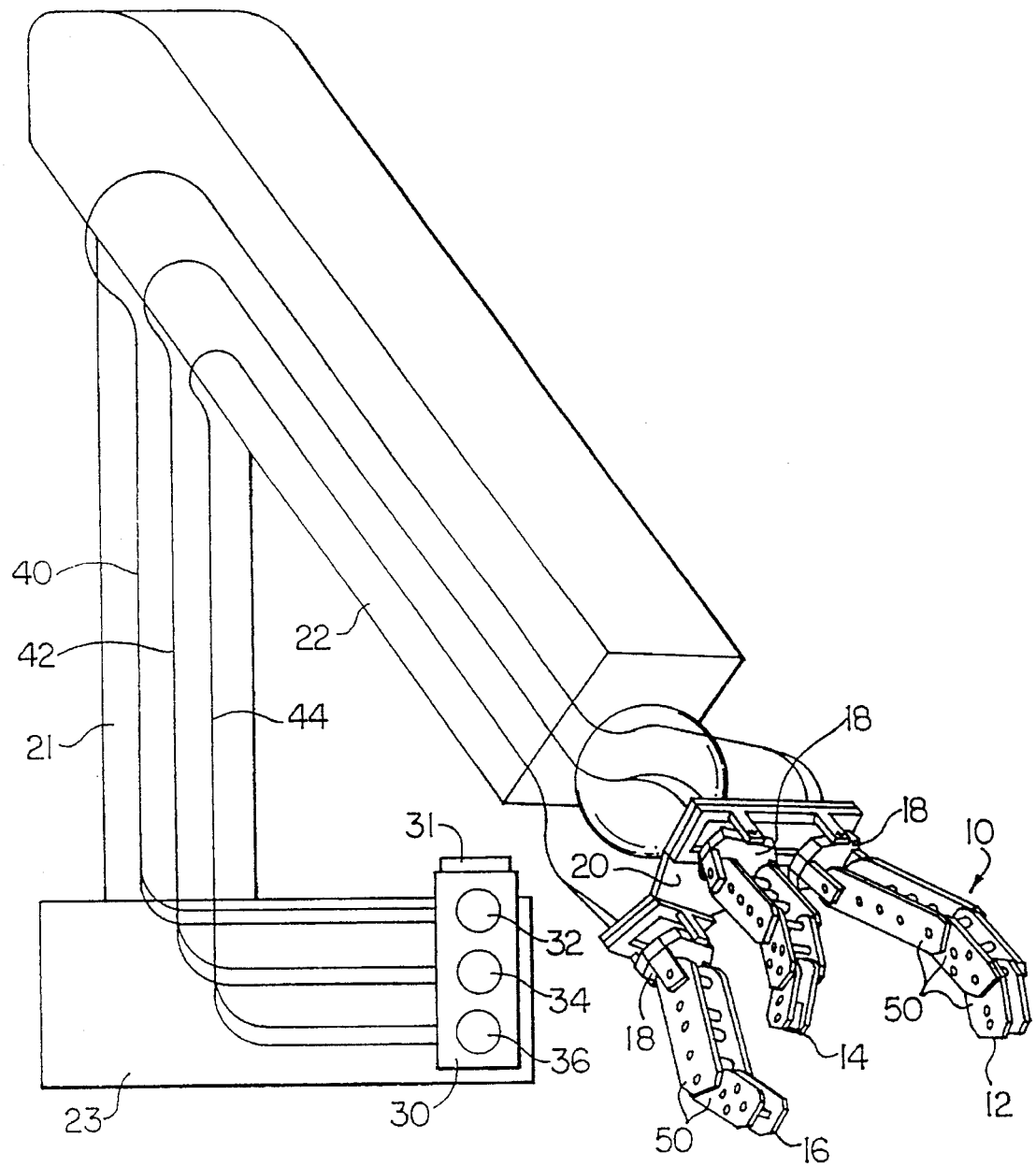
FIG. 1 is a perspective view of a robot arm end effector in an illustrative embodiment.

Referring now to FIG. 1, a robot arm end effector 10 includes, in an illustrative embodiment, two finger digits 12, 14 and a thumb digit 16, each digit having a plurality of phalanges 50. Other embodiments can employ a number of digits other than three, though the use of three digits provides a balance between control and structural simplicity and stability of grasp. The embodiment of FIG. 1 specifically includes two finger digits 12, 14 having three phalanges 50 each, and one thumb digit 16 having two phalanges 50, though other combinations of digits and phalanges are envisaged.

Each digit 12, 14, 16 of the embodiment of FIG. 1 interacts with a respective base portion 18, the base portions 18 in turn attached to a palm 20. The palm 20 and the previously described elements of the end effector 10 are attached to an end of a robot arm 22. In an illustrative embodiment, the palm 20 is pivotably mounted on the end of the robot arm 22 by wrist means known in the art. The specific type of robot arm 22 is not of critical importance in the present invention.

The robot arm 22 is shown disposed on a vertical member 21 and a robot base 23, as known in the art. Disposed proximate the robot base 23 is a bracket 30 supporting a motor controller 31 and three DC motors 32, 34, 36, each associated with a respective digit 12, 14, 16. First, second, and third motors 32, 34, 36 are connected to a first finger digit 12, a second finger digit 14, and the thumb digit 16, respectively, via pairs of filaments 40, 42, 44. The filament pairs 40, 42, 44 are routed along the vertical member 21 and robot arm 22, then through pulley systems disposed within each of the digits 12, 14, 16, as will be discussed in greater detail with respect to FIGS. 4, 5 and 6. Sufficient slack in the cables is provided to allow full motion of the robot arm 22.

To summarize the action of the filament pairs, contracting one filament of a pair causes the phalanges 50 of each digit 12, 14, 16 to articulate or curl in an inward direction, simulating in some respects the movement of a human digit. Contracting the other filament of the pair causes the phalanges 50 to articulate in an opposite direction, effectively straightening the digit.

A first embodiment of the end effector 10 according to the present invention, wherein the base portions 18 are fixedly attached to the palm 20, is illustrated in FIG. 1. This embodiment is appropriate for applications in which complexity must be minimized or in which objects to be manipulated are of a known size or range of sizes.

Figure 2:
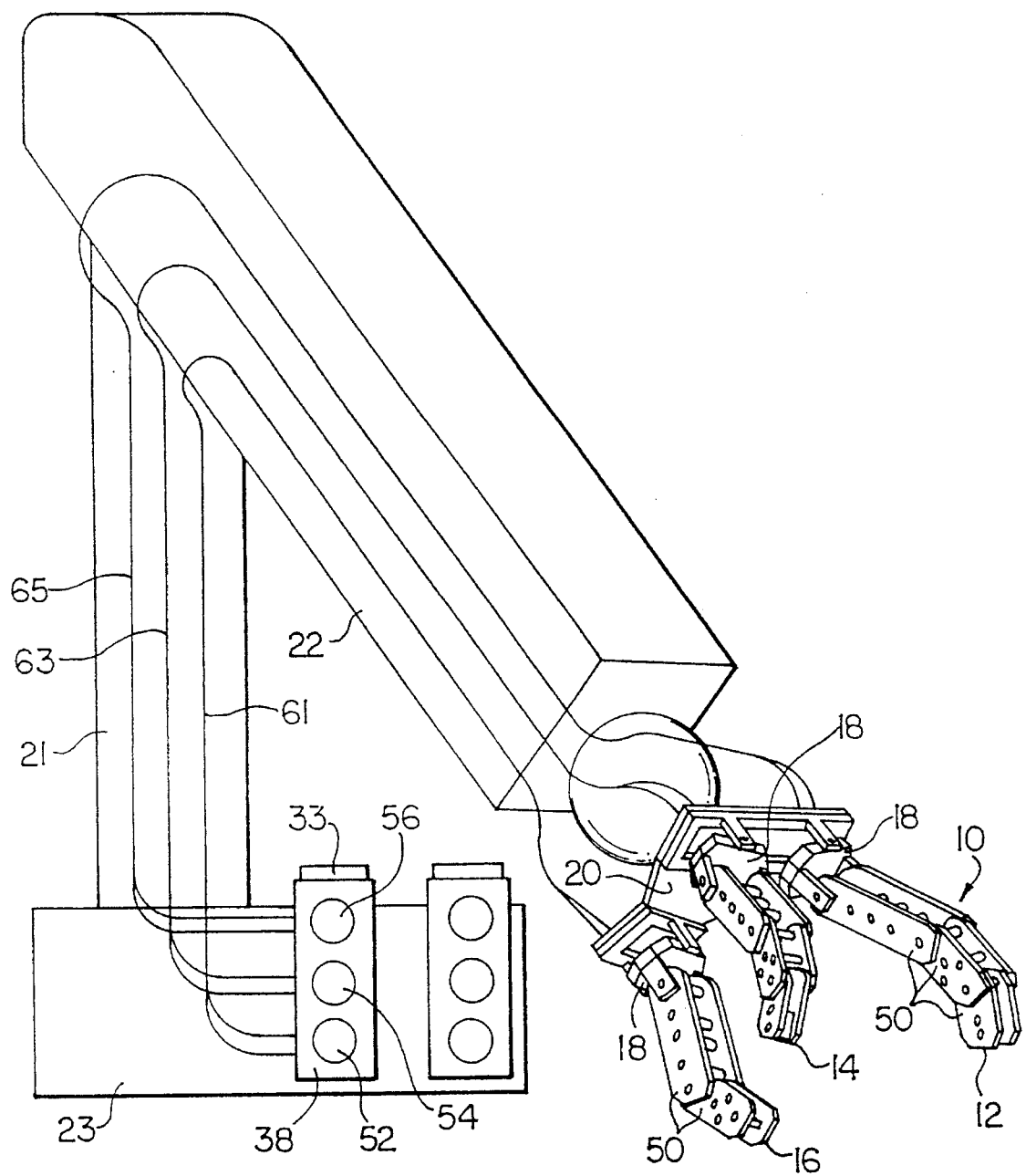
FIG. 2 is a perspective view of an alternative embodiment of the end effector of FIG. 1.

FIG. 2 illustrates a second embodiment suitable for applications requiring greater ability to adapt end effector 10 grasp. The base portions 18 in this embodiment are pivotally attached to the palm 20, thus allowing ends of the respective digits 12, 14, 16 to describe arcs in a lateral direction. Control over the lateral movement of each digit 12, 14, 16 is provided by controller 33 via DC motors 52, 54, 56 similar to the motors 32, 34, 36 described above, wherein one motor 52, 54, 56 communicates with one digit 12, 14, 16 via a pair of filaments 61, 63, 65. The motors 52, 54, 56 are shown disposed proximate the robot base 23 and on a bracket 38, and the associated filament pairs 61, 63, 65 are also disposed along the vertical member 21 and robot arm 22. The details with respect to how these filaments provide motion control for the base portions 18 are also provided with respect to FIGS. 4, 5 and 6.

Figure 3:
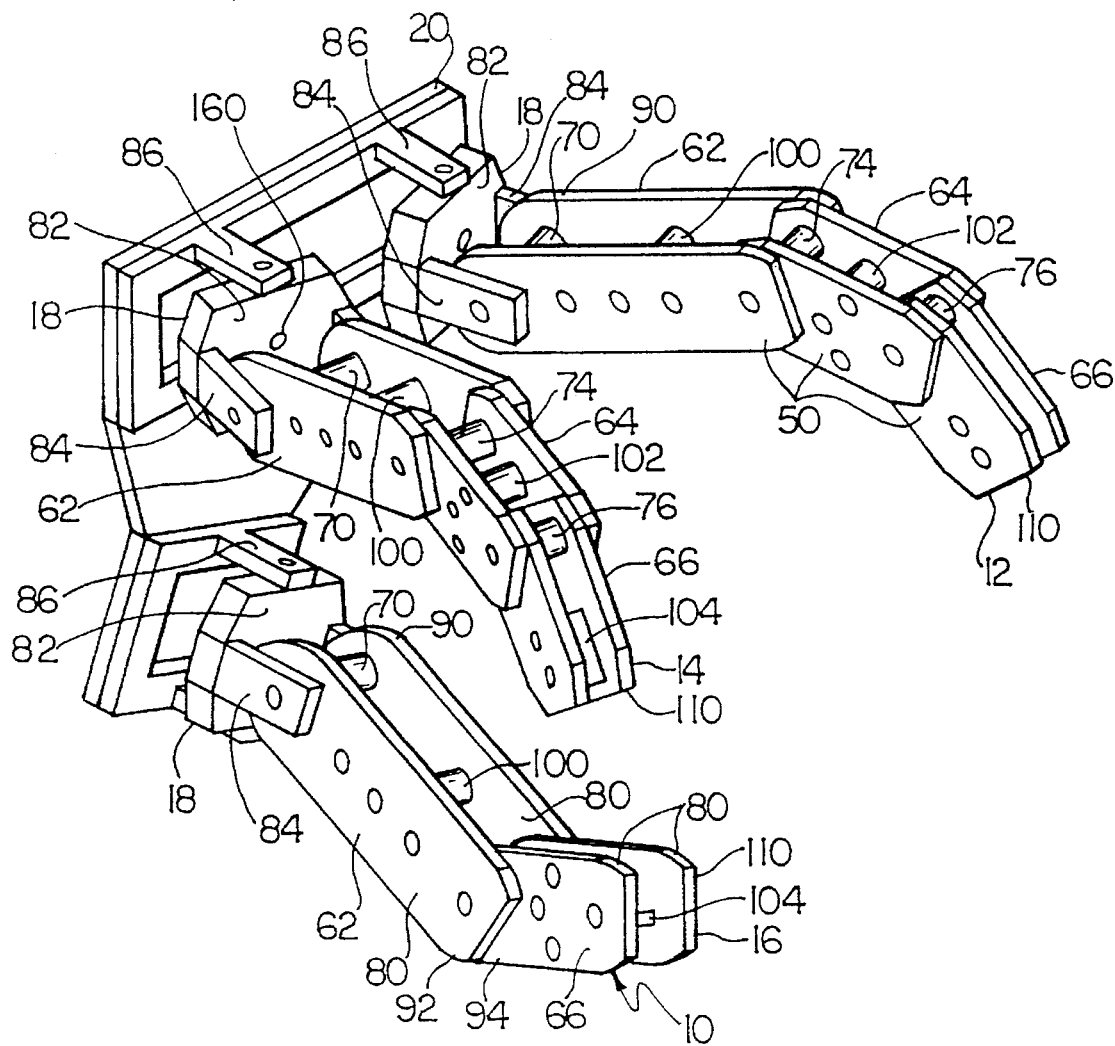
FIG. 3 is a detailed perspective view of the end effector of FIG. 1.

The end effector 10 introduced in FIGS. 1 and 2 is described in more detail now with respect to FIG. 3. First digit 12 and second digit 14 are comprised of three phalanges 50 each, a proximal phalange 62, an intermediate phalange 64, and a distal phalange 66. The thumb digit 16 has two phalanges 50, a proximal phalange 62 and a distal phalange 66. As noted previously, the present invention need not have the same number of digits as described in the illustrative embodiment of the Figs., nor need each digit have the same number of phalanges as depicted.

The palm 20 has multiple pairs of base portion receiving arms 86 extending in a first direction, each pair of arms 86 capturing therebetween a base portion 18. In the end effector embodiment of FIG. 1, the base portions 18 are rigidly fixed between the arms 86, whereas in the embodiment of FIG. 2, it is desired that the digits 12, 14, 16 rotate about an axis drawn between the two arms 86 of a pair. Thus, each base portion 18 in this latter embodiment is pivotally disposed within a respective base portion receiving arm pair 86.

The base portions 18 are each comprised of a platform 82 and a pair of phalange receiving arms 84 extending outwardly from the platform 82 generally in the first direction. The phalanges 50 are each defined by parallel spaced side walls 80. At a union of base portion 18 and proximal phalange 62, as typified by the union between the base portion 18 and the first finger digit 12 in FIGS. 3 and 6, the parallel spaced side walls 80 of the proximal phalange 62 are attached to the phalange receiving arms 84 at a first end 90 of the phalange 62.

Figure 6:
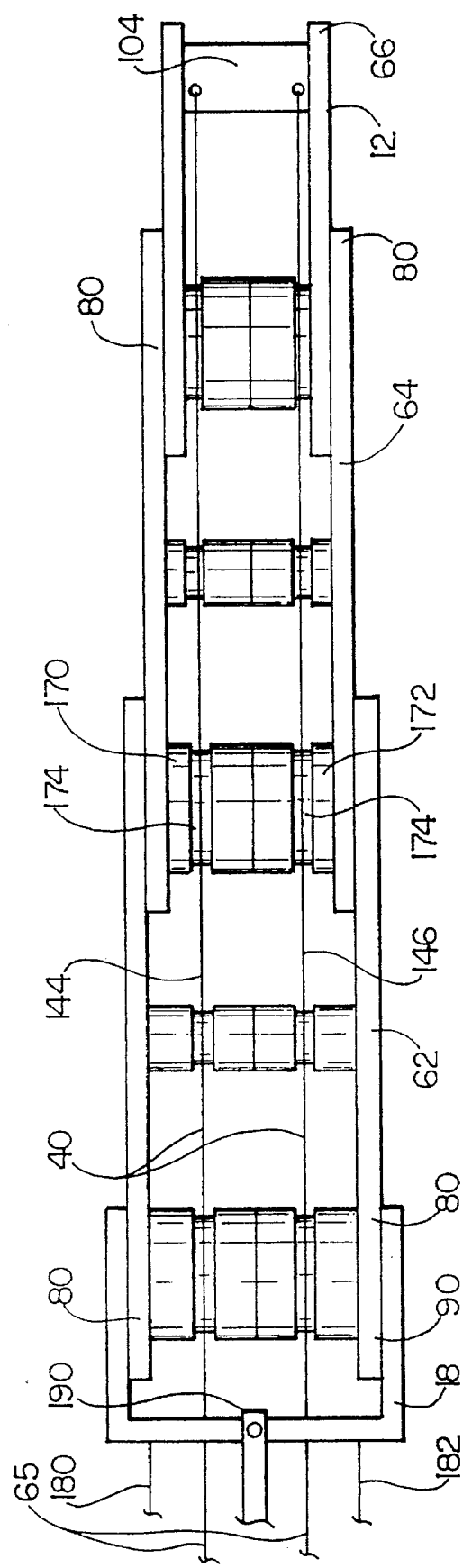
FIG. 6 is a top plan view of a finger phalange of the end effector of FIG. 1.

A base pivot member 70 is disposed between the spaced side walls 80 of the proximal phalange 62 and the phalange receiving arms 84 at each union of proximal phalange 62 and base portion 18, as viewed in FIGS. 3 and 6. While these views illustrate the phalange receiving arms 84 against outside surfaces of the side walls 80, any other configuration allowing the proximal phalange 62 to pivot about the base pivot member 70, parallel to the base portion platform 82, may be employed.

Moving in the first direction along the digits 12, 14, 16, away from the palm 20, the next union is between the proximal phalange 62 and the next phalange 50, which is the distal phalange 66 on the thumb digit 16 and the intermediate phalange 64 on the first and second finger digits 12, 14. For explanatory purposes, reference is made to the thumb digit 16. This union involves an overlap between the first side walls 80 of a proximal phalange second end 92 disposed against outside surfaces of side walls 80 of a distal phalange first end 94.

Disposed between the side walls of the intersecting phalanges 62, 66 is a first joint pivot member 74, similar in form to the base pivot member 70. It is again noted that the configuration shown and described with respect to intersecting side walls 80 is exemplary, and that other configurations which provide a first joint pivot member 74 parallel to the base pivot member 70 are employable in the present invention.

With regard to the first and second finger digits 12, 14, the first joint pivot member 74 is disposed between ends of the proximal phalanges 62 and the intermediate phalanges 64. In the illustrated embodiment, there are no more phalange unions on the thumb digit 16. However, both the first and second finger digits 12, 14 have one more union each located between the intermediate phalanges 64 and the distal phalanges 66, in which a second joint pivot member 76 is disposed. The configuration of the phalanges at these unions are as described above with respect to the base pivot member 70 and the first joint pivot member 74. Once again, it is noted that the number of phalanges 50 in the digits 12, 14, 16 and the number of digits 12, 14, 16 on the robot end effector 10 according to the present invention can vary from that illustrated and described according to the needs of various applications.

Description of the proximal and intermediate phalanges 62, 64 is again typified with reference to the proximal phalange 62 of the thumb digit 16. A first spacing member 100 is disposed intermediate and parallel to the base pivot member 70 and the first joint pivot member 74. Similarly, a second spacing member 102 is disposed within the intermediate phalanges 64 of the first and second finger digits 12, 14, intermediate and parallel to the first joint pivot members 74 and the second joint pivot members 76. In alternative embodiments of the present invention, multiple spacing members can be disposed within a single phalange, as long as they do not interfere with the filaments disposed therein, as discussed in detail below. One reason for employing multiple spacing members is to provide a phalange of enhanced rigidity. For example, the intermediate phalange 64 of the first finger digit 12 of FIG. 5 is illustrated having four structural spacing members 106 which do not interfere with the filament pair 40 disposed within the digit 12.

In the illustrated embodiment, there are no spacing members associated with the distal phalanges 66 of either the first finger digit 12, the second finger digit 14, or the thumb digit 16. Rather, the distal phalanges 66 each have an anchor point 104 disposed at a second end 110 of the distal phalanges 66. As will be discussed hereinbelow, pairs of filaments disposed within the digits terminate at these anchor points 104.

Figure 4:
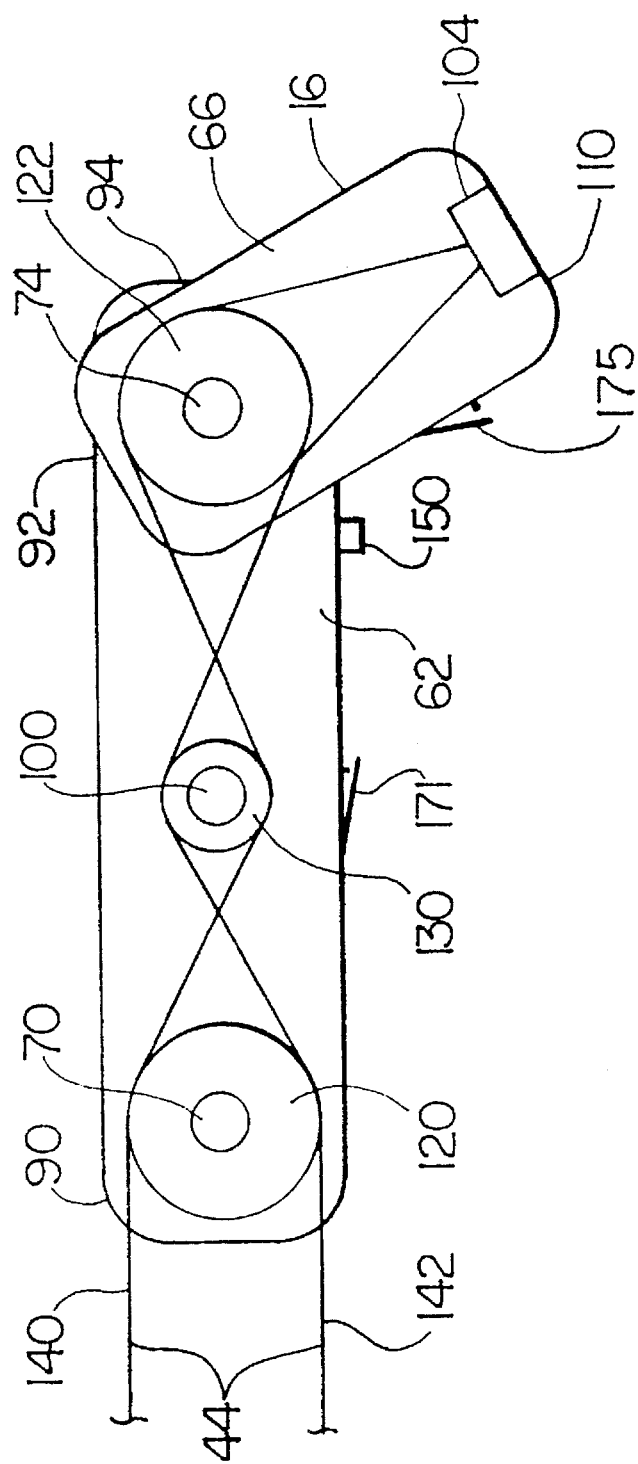
FIG. 4 is a schematic side view of a thumb phalange of the end effector of FIG. 1.
Figure 5:
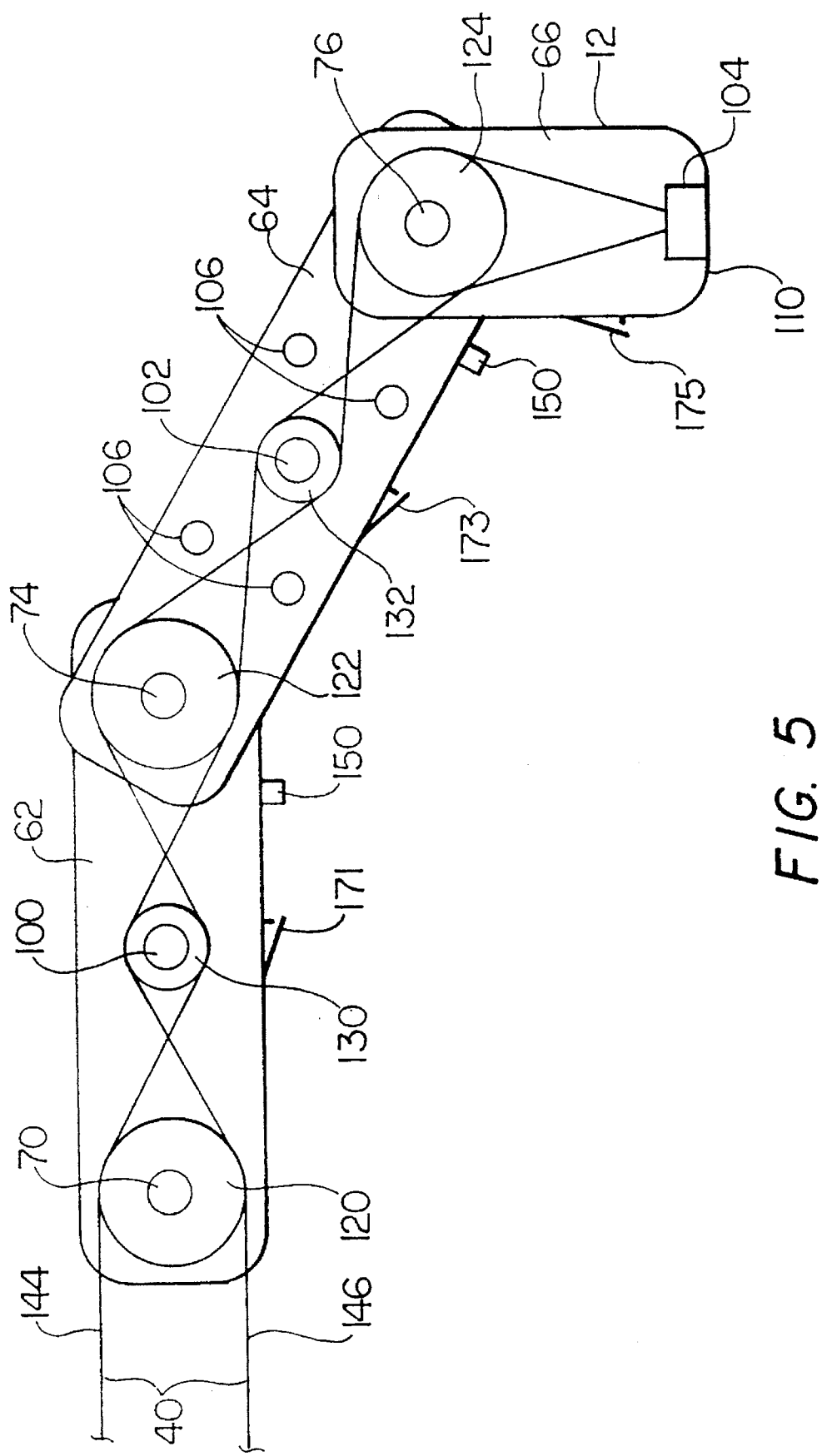
FIG. 5 is a schematic side view of a finger phalange of the end effector of FIG. 1.

A system of pulleys is formed within each of the digits 12, 14, 16, as can be seen with reference to FIGS. 4, 5 and 6. In FIG. 4, the pulley system of the thumb digit 16 is discussed. A base pivot pulley 120 is disposed about the base pivot member 70, and a first joint pulley 122 is likewise disposed about the first joint pivot member 74. Similarly, a first spacing pulley 130 is disposed about the first spacing member 100.

In FIGS. 5 and 6, the system of pulleys associated with the first finger digit 12 is illustrated. The disposition of the base pivot pulley 120, the first joint pulley 122, and the first spacing pulley 130 is the same as in FIG. 4. However, the additional phalange of the illustrated first finger digit 12 requires the use of a second joint pulley 124 disposed about the second joint pivot member 76, and of a second spacing pulley 132 disposed about the second spacing member 102. It is again noted that multiple structural spacing members 106 can be employed within a phalange 50 if they do not interfere with the routing of filaments within a digit 12, 14, 16.

Each of the above referenced pulleys can take the form of a single tube having a circumferential groove or grooves in which are routed filaments, as discussed below. In another embodiment, illustrated in FIG. 6, a first independently rotating tube 170 and a second such tube 172 are disposed on each pivot member 70, 74, 76 and spacing member 100, 102. The first tube 170 has a groove 174 and one filament 144 of a filament pair 40 therein. The second tube 172 has a second filament 146 disposed in the groove 174.

In either pulley embodiment, the tubes can be fixed about the inner pivot member or spacing member. However, to decrease the resistance of the pulley system and to minimize heat build-up and friction damage to the filaments, the tubes can be made to rotate about the respective pivot member or spacing member in response to the movement of the filaments across the surface of the tubes.

As discussed above with respect to FIGS. 1, 2 and 6, one pair of filaments associated with each digit controls the grasp or relaxation of the respective digit. In FIG. 4, the pair of filaments 44 disposed within the thumb digit 16 are comprised of a first filament 140 and a second filament 142. The first filament 140 passes over a first side of the base pivot pulley 120, between the base pivot member 70 and the first spacing member 100, over a second side of the first spacing pulley 130, between the first spacing member 100 and the first joint pivot member 74, over a first side of the first joint pulley 122, and attaches to an anchor point 104. The second filament 142 takes the opposite path, passing over the second sides of the base pivot pulley 120 and the first joint pulley 122, and over the first side of the first spacing pulley 130, also attaching to the anchor point 104. Thus, the in-plane motion of each digit is controlled by one respective filament pair.

The individual filaments 140, 142 can pass over the pulleys in two ways. First, the filament can lie across the pulley, thus making contact with less than fifty percent of any pulley at any one time. Second each filament can make at least one loop around each pulley resulting in at least fifty percent of the filament remaining in contact with each pulley at once.

With reference to FIG. 5, it can be seen that the depicted filament pair 40 comprising a first filament 144 and a second filament 146 associated with the first finger digit 12, follows the same path as does the filament pair 44 associated with the thumb digit 16 with the exception that the first filament 144 continues past the first joint pulley 122 between the first joint pivot member 74 and the second spacing member 102, over a second side of the second spacing pulley 132 between the second spacing member 102 and the second joint pivot member 76 over a first side of the second joint pulley 124 and thence to the anchor point 104. Likewise, the second filament 146 follows the opposite alternating path, passing over the first side of the second spacing pulley 132 and the second side of the second joint pulley 124 before attaching to the anchor point 104.

The filament pair 42 associated with the second finger digit 14 follows the same route as the filament pair 40 associated with the first finer digit 12 as depicted in FIG. 5.

As previously introduced, a DC motor 32 34, 36 is connected to each of the filament pairs 40, 42, 44 for causing opposing retraction and relaxation of the filaments in the pairs. Specifically, gain referring to the thumb digit 16 of FIG. 4, retraction of filament 140 while relaxing tension in filament 142 causes the phalanges 62, 66 to curl in a direction toward the top of the page in FIG. 4. Reversing the retraction and relaxation on the filaments 140, 142 causes the phalanges 62, 66 to curl in the opposite direction. Depending upon the application, mechanical stops 150 can be provided to limit the amount of travel the phalanges 62, 66 experience relative to one another.

Similarly, with reference now to the first finger digit 12 of FIG. 5, retraction of the first filament 144 and relaxation of the second filament 146 results in the phalanges 62, 64, 66 curling toward the top of the figure. Reversing the retraction and relaxation between the filaments 144, 146 causes the phalanges to curl in the opposite direction.

Such retraction and relaxation is accomplished by winding first ends of paired filaments in opposite directions on a DC motor rotor (not illustrated), while attaching a second end of the filaments to the anchor point 104. Thus, for example, if the motor 36 associated with the thumb digit 16 is driven in a first direction, the first filament 140 of the filament pair 44 is unwound from the rotor, while the second filament 142 is wound about the rotor. Thus, the second filament 142 is retracted, the first filament 140 is relaxed, and the phalanges 62, 66 of the thumb digit 16 curl downward relative to the drawing in FIG. 4, about base pivot member 70 and first pivot member 74. In a similar fashion, if the motor 36 is driven in the opposite direction, the first filament 140 is wound up on the rotor and the other filament 142 is unwound, thus causing the phalanges 62, 66 of the thumb digit 16 to curl upward relative to the drawing in FIG. 4.

In order to provide lateral motion control in the end effector 10 embodiment of FIG. 2, DC motors 52, 54, 56 are connected to the first finger digit 12, the second finger digit 14, and the thumb digit 16, respectively, via filament pairs 61, 63, 65. First ends of paired filaments are oppositely wound on respective motor rotors. With regard to the first finger digit 12 and associated base member 18 of FIG. 6, a filament pair 65 comprised of first lateral filament 180 and second lateral filament 182 is physically connected to the base member 18 by any conventional means.

It can be seen that driving the motor 56 associated with the filament pair 65 in a first direction, the first filament 180 is wound about the motor rotor. The second filament 182, wound about the rotor in an opposite direction relative to the first filament 180, will consequently be relaxed. Thus, the entire first finger digit 12 will pivot about a lateral pivot member 190 in an upward direction with respect to the drawing in FIG. 6. Driving the motor 56 in the opposite direction causes the first filament 180 to be relaxed and the second filament 182 to be wound up, thus causing the first finger digit 12 to pivot downward about the lateral pivot member 190 with respect to the drawing in FIG. 6.

By allowing the filaments to slip around the pulleys, or to have the pulleys rotate in response to forces exerted upon them by respective filaments, it is possible for a phalange 50 to rotate about one of the pivot members within a digit 12, 14, 16 even though other phalanges associated with other pivot members in the digit are not rotating. For instance, if the proximal phalange 62 of the thumb digit 16 of FIG. 4 is in contact with a rigid object but the distal phalange 66 is not yet in contact, and if the second filament 142 were being retracted, distal phalange 66 can continue to rotate about first pivot member 74. Thus, the end effector 10 of the present invention provides a conformable grasp.

To regulate how long contractive force is applied to a filament, which results in grasping force being applied to an object to be grasped, sensors 171, 173, 175 are disposed along an inside surface of the phalanges 50. The sensors 171, 173, 175 can be strain gauges or sensors, though other forms of sensors can be employed, depending upon the application. Further, the motor controller 31 can be programmed to cease respective motor drive upon actuation of one or more of the sensors 171, 173, 175 on a digit, again depending upon the application. The number of sensors employed and the configuration they assume also depends upon the end effector 10 application.

Various materials for the filament pairs 40, 42, 44, 61, 63, 65 can be used, such as a simple metallic cable or a woven filament such as rope or string. However, without a protective and supporting sheath, retraction would cause such cables to assume a path of minimum length. Thus, configuring the DC motors 32, 34, 36, 52, 54, 56 and the brackets 30, 38 would become a critical design matter.

One way to avoid this problem is to position the motors 32, 34, 36, 52, 54, 56 as close to the palm 20 as possible. However, this is not always feasible due to the size and weight of the motors and associated mounting hardware.

Another way to resolve this is to employ sheathed cable as typically found in bicycle brake and shifting applications. The sheath for such a cable is installed between the brackets 30, 38 and the palm 20, with the flexible cable running therethrough. Providing sheathed cable minimizes concern for motor placement and filament routing along the length of the robot arm 22 since cable path length between the bracket 30 and the palm 20 is defined by the sheath.

Employing sheathed cable also eliminates the necessity for the DC motors 32, 34, 36, 52, 54, 56 to be disposed immediately proximate the end effector 10 or on the robot arm 22. Rather, as illustrated in FIGS. 1 and 2, the motors 32, 34, 36, 52, 54, 56 can be placed on any non-moving platform in the vicinity of the robot arm 22 supporting the end effector 10. However, it can be seen that disposing the motors 32, 34, 36, 52, 54, 56 proximate the robot arm 22 minimizes the amount of filament located in the vicinity of moving parts and minimizes friction developed along the cable run.

Filament routing between the palm 20 and the base pivot pulley 120 is through an orifice 160 best viewed in the base portion 18 of the second finger digit 14 in FIG. 3. A circular opening is appropriate for the end effector 10 embodiment of FIG. 1 in which base portions 18 are rigidly attached to the palm 20. However, in the embodiment of FIG. 2 in which the base portions 18 pivot relative to the palm 20, the orifice 160 should be oblong or rectangular to avoid base portion 18 interference with the travel of the filament due to the orientation of the respective digit.

Other improvements over prior art end effectors are possible. For instance, the end effector 10 can be selectively coated with a non-slip material such as a rubber compound for improved grip and to minimize exposure of sharp edges. Further, one or more of the phalanges can assume a specialized geometry, depending upon the application. Specifically, one or more of the distal phalanges 66 can have a pointed second end 110 suitable for actuating switches such as keyboard keys, piano keys or elevator buttons.

Although the invention has been shown and described with respect to an illustrated embodiment thereof, it should be understood by those skilled in the art that the foregoing and various other changes, omissions and additions in the form and detail thereof may be made therein without departing from the spirit and scope of the invention.

What is claimed is:

1. A robot arm end effector providing conforming, adaptive grasping of varied objects, comprising:

a palm having a first surface;

a plurality of base couplings disposed on said first surface;

a plurality of digits, each of said digits disposed on a respective one of said plurality of base couplings, each of said digits comprised of a plurality of sequentially disposed phalanges;

a system of sequentially disposed pulleys within each of said digits, each of said pulleys being freely rotatable;

a first pair of antagonistic filaments disposed within said system of pulleys, said first pair of filaments comprised of a first filament and a second filament, said first filament disposed on alternating sides of sequential ones of said system of pulleys, and said second filament disposed on opposing sides of said sequential ones of said system of pulleys with respect to said first filament; and motive means associated with said first pair of antagonistic filaments for simultaneously retracting said first filament and allowing extension of said second filament.

2. The end effector according to claim 1, wherein said plurality of digits is comprised of a thumb digit and a plurality of finger digits.

3. The end effector according to claim 2, wherein said thumb digit is comprised of a proximal phalange and a distal phalange.

4. The end effector according to claim 3, wherein each of said plurality of finger digits is comprised of a proximal phalange, an intermediate phalange, and a distal phalange.

5. The end effector according to claim 4, wherein each of said proximal and intermediate phalanges is comprised of a pair of parallel, spaced apart support elements, at least one spacing element disposed therebetween, and a first and a second joint termination disposed at respective ends of said phalange.

6. The end effector according to claim 5, wherein each of said distal phalanges is comprised of a pair of parallel, spaced apart support elements, and a first joint termination and an anchor location disposed at respective ends of said phalange.

7. The end effector according to claim 6, wherein each of said plurality of base couplings is comprised of a pivotally mounted platform and a pair of parallel support elements extending therefrom, said pair of support elements mated to a respective first joint termination, thus forming a pivot point.

8. The end effector according to claim 7, wherein a pivot point is formed at a juncture of a respective second joint termination and a respective first joint termination of two sequential phalanges.

9. The end effector according to claim 8, each said system of pulleys comprising a joint pin disposed at each of said pivot points and an idler pin centrally disposed within each said proximal phalange and each said intermediate phalange, said idler pin extending between and orthogonal to said parallel support elements thereof.

10. The end effector according to claim 9, wherein said system of pulleys further comprises a joint pulley disposed about each of said joint pins and an idler pulley disposed about each of said idler pins.

11. The end effector according to claim 10, wherein said first pair of antagonistic filaments further comprises a digit contraction filament slidably disposed on a first side of each of said joint pulleys and on a second side of each of said idler pulleys, and a digit retraction filament slidably disposed on a second side of each of said joint pulleys and on a first side of each of said idler pulleys.

12. The end effector according to claim 11, wherein each filament of said first pair of antagonistic filaments has an attachment point at a respective distal phalange anchor point.

13. The end effector according to claim 1, wherein each of said digits further comprises at least one sensor disposed on a respective phalange.

14. A robot hand providing a conformable grasp, comprising:

a palm;

a plurality of articulable digits disposed on said palm;

a plurality of pulley systems, each disposed within a respective one of said plurality of digits and each further comprising a plurality of pulleys, each of said pulleys being freely rotatable, and two non-interfering filament paths defining opposite travel paths on alternating sides of sequential ones of said plurality of pulleys within a respective pulley system;

first and second antagonistic filaments disposed within respective ones of said two non-interfering filament paths of each of said plurality of pulley systems; and a motor for simultaneously retracting said first antagonistic filament while slackening said second antagonistic filament to provide independent control over digit contraction and retraction.

15. The robot hand according to claim 14, each of said plurality of articulable digits comprising a plurality of sequentially disposed phalanges, wherein relative motion of said plurality of phalanges of one of said plurality of digits defines a first plane.

16. The robot hand according to claim 15, each of said pulley systems comprising a joint pulley disposed at each intersection of contiguous sequentially disposed phalanges and an idler pulley disposed intermediate said joint pulleys.

17. The robot hand according to claim 16, each of said plurality of articulable digits further comprising a distal phalange, said distal phalange comprising a joint pulley and a filament anchor point.

* * * * *

UNITED STATES PATENT AND TRADEMARK OFFICE
CERTIFICATE OF CORRECTION

PATENT NO. : 5,570,920
DATED      : November 5, 1996
INVENTOR(S): Jill D. Crisman, et al.

It is certified that error appears in the above-identified patent and that said Letters Patent is hereby corrected as shown below:

On the title page:

Item [75], Inventors, "Chaitanya Kanojia, Bhopal, Ind.;" should read --Chaitanya Kanojia, Bhopal, India:--.

Signed and Sealed this

Eighth Day of September, 1998

Attest:

BRUCE LEHMAN

*Attesting Officer*        Commissioner of Patents and Trademarks